United States Patent [19]

Tarumi et al.

[11] 4,393,184
[45] Jul. 12, 1983

[54] LENS HAVING A HIGH REFRACTIVE INDEX WITH A LOW DISPERSION

[75] Inventors: Niro Tarumi; Shigeo Komiya, both of Akishima; Mitsuo Sugimura, Fussa, all of Japan

[73] Assignee: Hoya Lens Corporation, Tokyo, Japan

[21] Appl. No.: 315,354

[22] Filed: Oct. 26, 1981

[30] Foreign Application Priority Data

Dec. 15, 1980 [JP] Japan .................... 55/175779

[51] Int. Cl.$^3$ ............................................ C08F 18/16
[52] U.S. Cl. ............................ 526/261; 204/159.22; 264/1.1; 350/409; 428/442; 526/286; 526/292.1; 526/292.4; 526/292.6; 526/292.7; 526/322; 526/326
[58] Field of Search .............. 526/261, 286, 292.1, 526/292.4, 292.6, 292.7, 322, 326

[56] References Cited

U.S. PATENT DOCUMENTS 2,855,434  10/1958  Fekete .................... 526/326
3,170,899   2/1965  Tocker .................... 526/326

*Primary Examiner*—Harry Wong, Jr.
*Attorney, Agent, or Firm*—Sprung, Horn, Kramer & Woods

[57] ABSTRACT

A lens having a high refractive index with a low dispersion produced by copolymerizing a polyfunctional allyl monomer with at least one monomer selected from the group represented by the general formula A:

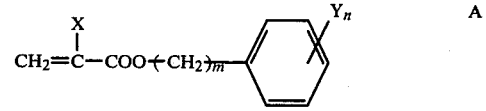

X: H, CH$_3$, Cl
Y: H, CH$_3$, C$_2$H$_5$, n-C$_3$H$_7$, iso-C$_3$H$_7$, OCH$_3$, C$_6$H$_{11}$, Cl, Br, CH$_2$Cl, CH$_2$Br, C$_6$H$_5$, CH$_2$C$_6$H$_5$, SCH$_3$
m=0, 1, 2
n=0, 1, 2, 3, 4, 5.

This lens is excellent in its transmittance, pencil hardness, impact resistance, dyeability, coating adhesion, solvent resistance, workability, etc.

2 Claims, No Drawings

LENS HAVING A HIGH REFRACTIVE INDEX WITH A LOW DISPERSION

BACKGROUND OF THE INVENTION

1. Field of the Invention

This invention relates to a plastic lens having a high refractive index with a low dispersion.

2. Description of the Prior Art

Recently plastic lenses have been widely used instead of inorganic glass lenses, because plastic lenses are more advantageous than inorganic glass lenses in the many properties such as lightness, safety, workability, dyeability, etc. For example, lenses made from diethylene glycol bisallyl carbonate (hereinafter referred to CR39) have been widely used. But, lenses made from CR39 have such a disadvantage that the lenses must be thicker than inorganic glass lenses, because of their relatively low refractive index such as 1.499. As the material for the plastic lenses with a high refractive index are known polystyrene or polycarbonate. However, they are considerably inferior to the polymer of CR39 in the superficial hardness, solvent resistance, weatherability, cutting-ability, dyeability, etc. Moreover, they have such a large dispersion that they are unfavorable as spectacle lens.

We have now found that the copolymer produced from polyfunctional allyl monomer and (meth) acrylate having an aromatic ring enables to produce a plastic lens having a low dispersion and a high refractive index, so that above-said drawbacks are dissolved.

An object of this invention is to provide a plastic lens having a high refractive index with a low dispersion.

SUMMARY OF THE INVENTION

This invention relates to a lens obtained by a process comprising polymerizing polyfunctional allyl monomer with at least one selected from the monomer group represented by the general formula A:

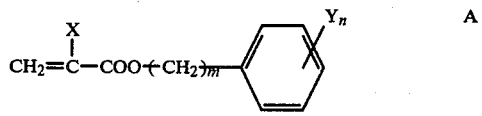

X: H, CH$_3$, Cl
Y: H, CH$_3$, C$_2$H$_5$, n-C$_3$H$_7$, iso-C$_3$H$_7$, OCH$_3$, C$_6$H$_{11}$, Cl, Br, CH$_2$Cl, CH$_2$Br, C$_6$H$_5$, CH$_2$C$_6$H$_5$, SCH$_3$
m=0, 1, 2
n=0, 1, 2, 3, 4, 5.

DETAILED DESCRIPTION OF THE PREFERRED EMBODIMENTS

As the polyfunctional allyl monomer of this invention are cited diallylorthophthalate, diallylisophthalate, diallylterephthalate, diallylchlorendate, triallylcyanurate, triallylisocyanurate, etc. They can be used solely or in a mixture of two or more. In the mixture of diallyl monomer and triallyl monomer, triallyl monomer is preferably used in an amount of at most 10 wt. %. The use of triallyl monomer in an amount more than 10 wt. % is practically unfavorable, because of lowering the impact resistance of the lens obtained therefrom.

The lens of this invention can be prepared by the method comprising pouring the mixed solution consisting of above-said monomers and a polymerization initiator into a mold made of two plates of glass mold and a plastic gasket, and then heating or irradiating with ultraviolet ray the resulting one.

The lens of this invention has an improved dispersion compared with well known lens made from polycarbonate or polystyrene, so that very little chromatic aberration appears in spite of the high refractive index in the lens, which is one of the features of this invention. The superficial hardness, solvent resistance, and workability thereof are considerably superior to those of polycarbonate lens or polystyrene lens. Coating glass film thereon by vacuum evaporation coating method can be easily effected, so that the ability of anti-reflection of the lens is excellent.

This invention will be more clearly understood with reference to the following Examples.

EXAMPLE 1

A mixed solution consisting of 30 wt. parts of phenyl methacrylate, 70 wt. parts of diallylisophthalate and 2.5 wt. parts of diisopropylperoxydicarbonate was poured into a mold made of two plates of glass mold, and a gasket of ethylene-vinylacetate copolymer, and the resulting one was heated to raise gradually the temperature from 40° C. to 90° C. in 24 hours. After end of the polymerization, the lens was taken out of the mold, and then was post-cured at 120° C. for one hour. The resulting lens had 1.569 of refractive index, 35 of Abbé's number, 91% transmittance (550 nm), 2H of pencil hardness, a high impact resistance which passed inspection of FDA Standard, a good solvent resistance, a good dyeability, a good adhesion of coating glass film, and such a good workability that cutting and grinding it can be easily carried out.

EXAMPLE 2-11, COMPARATIVE EXAMPLE 1-2

The lenses were made in the same manner as in Example 1, except that conditions in Table 1 were used. The result is shown in Table 1.

TABLE 1

| | | Properties of Lens | | | | | | |
| Example | monomer composition | % Transmittance | Refr. Ind. | Abbé's number | Pencil Hardness | Solvent Resistance | Coating Adhesion | Workability |
|---|---|---|---|---|---|---|---|---|
| Ex. 1 | PhMA/DAIP(30/70) | 91 | 1.569 | 35 | 2H | | | |
| 2 | PhMA/DAIP(20/80) | 91 | 1.570 | 35 | 2H | | | |
| 3 | BzMA/DAIP(30/70) | 91 | 1.568 | 35 | H | | | |
| 4 | BzMA/DAIP(20/80) | 91 | 1.569 | 35 | H | | | |
| 5 | ClPhMA/DAIP(20/80) | 91 | 1.570 | 36 | 2H | | | |
| 6 | ClBzMA/DAIP(30/70) | 90 | 1.570 | 36 | H | | | |
| 7 | Cl$_5$PhMA/DATP(10/90) | 91 | 1.570 | 35 | 2H | | | |
| 8 | BrPhMA/DAIP(20/80) | 90 | 1.571 | 35 | 2H | | | |
| 9 | Br$_3$PhMA/DAIP(10/90) | 89 | 1.571 | 34 | 2H | | | |

TABLE 1-continued

| | | Properties of Lens | | | | | | |
|---|---|---|---|---|---|---|---|---|
| Example | monomer composition | % Transmittance | Refr. Ind. | Abbe's number | Pencil Hardness | Solvent Resistance | Coating Adhesion | Workability |
| 10 | BzMA/DAIP/TAIC(30/65/5) | 91 | 1.568 | 35 | 2H | | | |
| 11 | CiBzMA/DAIP/TAC(30/67/3) | 90 | 1.570 | 36 | 2H | | | |
| C. Ex. 1 | Polycarbonate | 89 | 1.584 | 29 | HB | X | X | X |
| 2 | polystyrene | 89 | 1.589 | 31 | HB | X | X | X |

Note 1.
ClPhMA: o-chlorophenyl methacrylate,
ClBzMA: o-chlorobenzyl methacrylate,
Cl₅PhMA: pentachlorophenyl methacrylate,
PhMA: phenyl methacrylate,
BrPhMA: p-bromophenyl methacrylate,
Br₃PhMA: 2,4,6-tribromophenyl methacrylate,
TAIC: triallylisocyanurate,
DATP: diallylterephthalate,
TAC: triallylcyanurate, DAIP: diallylisophthalate,
BzMA: benzyl methacrylate
Note 2.
Transmittance (%): measured at 550 nm light using the lens of 2.0 mm thickness,
Refractive Index, and Abbé's Number: measured by Abbé's refractometer,
Pencil Hardness: measured by JIS K5400
Solvent Resistance: by immersing it in acetone, methanol, and benzene for 24 hours
  : the surface did not become dull,
X: the surface became dull,
Workability:
  : can be ground by lens grinder,
X: can not be ground by lens grinder.

What is claimed is:

1. A lens having a low dispersion and a high refractive index, comprising a copolymer of at least one polyfunctional allyl monomer selected from the group consisting of diallylorthophthalate, diallylisophthalate, diallylterephthalate, diallylchlorendate, triallylcyanurate and triallylisocyanurate with at least one monomer of the formula

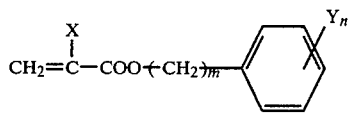

in which
X is H, CH₃ or Cl,
Y is H, CH₃, C₂H₅, n-C₃H₇, iso-C₃H₇, OCH₃, C₆H₁₁, Cl, Br, CH₂Cl, CH₂Br, C₆H₅, CH₂C₆H₅ or SCH₃,
m is 0, 1 or 2, and
n is 0, 2, 3, 4 or 5,
the polyfunctional allyl monomer comprising about 70 to 90% of the copolymer by weight, at most about 10% by weight of the polyfunctional allyl monomer comprising a trifunctional allyl monomer.

2. A lens according to claim 1, having a transmittance of at least about 89%, a refractive index of at least about 1.568, a pencil hardness of at least about H and an Abbe's number of at least about 34.

* * * * *